US010861402B2

(12) United States Patent
Xi

(10) Patent No.: US 10,861,402 B2
(45) Date of Patent: Dec. 8, 2020

(54) MULTIPLEXER AND DISPLAY PANEL

(71) Applicant: Au Optronics Corporation, Hsinchu (TW)

(72) Inventor: Peng-Bo Xi, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/386,266

(22) Filed: Apr. 17, 2019

(65) Prior Publication Data

US 2019/0325832 A1 Oct. 24, 2019

Related U.S. Application Data

(60) Provisional application No. 62/659,662, filed on Apr. 18, 2018.

(30) Foreign Application Priority Data

Mar. 4, 2019 (TW) ............................ 108107130 A

(51) Int. Cl.
*G06F 3/038* (2013.01)
*G09G 3/36* (2006.01)

(52) U.S. Cl.
CPC ... *G09G 3/3611* (2013.01); *G09G 2300/0809* (2013.01)

(58) Field of Classification Search
USPC ........................... 345/98, 212, 214, 204, 215
See application file for complete search history.

(56) References Cited

U.S. PATENT DOCUMENTS

| | | | | |
|---|---|---|---|---|
| 8,836,679 B2 | 9/2014 | Lin et al. | | |
| 2013/0093745 A1 | 4/2013 | Chen et al. | | |
| 2014/0009375 A1* | 1/2014 | Tsai | G09G 3/36 | 345/98 |
| 2014/0035896 A1 | 2/2014 | Lin et al. | | |
| 2015/0194109 A1* | 7/2015 | Fujikawa | G02F 1/1309 | 345/100 |
| 2016/0163255 A1* | 6/2016 | Kim | G09G 3/3291 | 345/212 |
| 2017/0061853 A1* | 3/2017 | Yang | G09G 3/22 | 345/214 |
| 2017/0329172 A1* | 11/2017 | Fujikawa | G02F 1/1309 | 345/214 |

(Continued)

FOREIGN PATENT DOCUMENTS

| | | |
|---|---|---|
| CN | 102087447 | 6/2011 |
| CN | 103164061 | 6/2013 |

(Continued)

*Primary Examiner* — Thuy N Pardo
(74) *Attorney, Agent, or Firm* — JCIPRNET

(57) ABSTRACT

The disclosure provides a multiplexer and a display panel. In the multiplexer, a first and second output ends are respectively connected to a first and second data transmission lines. Control ends of a first and second switches are respectively coupled to a first and second control lines. First ends of the first and second switches are respectively coupled to the first and second output ends. The first data transmission line, the second data transmission line, the first control line, and the second control line extend along a first direction, and the first output end and the second output end are disposed on opposite sides of the first control line.

13 Claims, 3 Drawing Sheets

(56) References Cited

U.S. PATENT DOCUMENTS

2018/0033366 A1* 2/2018 Yoo .................... G09G 3/3275
345/212
2018/0059838 A1* 3/2018 Chung ................ G06F 3/0412
345/214
2018/0299719 A1* 10/2018 Fujikawa ........... G02F 1/13454
345/204
2018/0315367 A1* 11/2018 Yang .................. G09G 3/2085
345/214

FOREIGN PATENT DOCUMENTS

CN 103366701 10/2015
TW 200816119 4/2008
TW 201317965 5/2013

* cited by examiner

MULTIPLEXER AND DISPLAY PANEL

CROSS-REFERENCE TO RELATED APPLICATION

This application claims the priority benefit of U.S. provisional application Ser. No. 62/659,662, filed on Apr. 18, 2018, and Taiwan application serial no. 108107130, filed on Mar. 4, 2019. The entirety of each of the above-mentioned patent applications is hereby incorporated by reference herein and made a part of this specification.

BACKGROUND

Technical Field

The disclosure relates to a display device, and more particularly to a multiplexer and a display panel.

Description of Related Art

With the advancement of electronic technology, display devices have become indispensable tools in people's lives. In order to provide a good man-machine interface, high-quality display panels have become necessary equipment in display devices.

In the prior art, in order to reduce the number of pins, the designer usually disposes a multiplexer in the display panel so that the source driver may provide the display data to the corresponding display pixel through the multiplexer and via data transmission lines and data lines. However, during the wiring (or the layout) planning of the display panel, the control lines which control the multiplexer often intersect or overlap with the data transmission lines (or the data lines). Under such situation, parasitic capacitance will be generated between the control lines and the data transmission lines (or the data lines), and the feed through effect occurs, thereby causing the charging rate of each display pixel to be reduced.

Therefore, how to effectively reduce the situation (or the quantity) of intersections or overlaps between the control lines and the data transmission lines (or the data lines) during the wiring (or the layout) planning of the display panel to prevent the quality of display image from being affected by the reduction in charging rate of display pixels shall be an important topic for persons skilled in the art.

SUMMARY

The disclosure provides a multiplexer and a display panel capable of effectively reducing the situation (or the quantity) of intersections or overlaps between control lines and data transmission lines (or data lines), thereby maintaining the display quality of display image.

The multiplexer of the disclosure is applicable for a display panel. The multiplexer includes a first output end, a second output end, a first switch, and a second switch. The first output end is used to connect to a first data transmission line. The second output end is used to connect to a second data transmission line. A control end of the first switch is coupled to a first control line, a first end of the first switch is coupled to the first output end, and a second end of the first switch is coupled to a data input line. A control end of the second switch is coupled to a second control line, a first end of the second switch is coupled to the second output end, and a second end of the second switch is coupled to the data input line. The first data transmission line, the second data transmission line, the first control line, and the second control line extend along a first direction, and the first output end and the second output end are disposed on opposite sides of the first control line.

The display panel of the disclosure includes a first data line, a second data line, and a multiplexer. The first data line is connected to at least one first display pixel. The second data line is connected to at least one second display pixel. The multiplexer includes a first output end, a second output end, a first switch, and a second switch. The first output end is used to connect to a first data transmission line. The second output end is used to connect to a second data transmission line. A control end of the first switch is coupled to a first control line, a first end of the first switch is coupled to the first output end, and a second end of the first switch is coupled to a data input line. A control end of the second switch is coupled to a second control line, a first end of the second switch is coupled to the second output end, and a second end of the second switch is coupled to the data input line. The first data transmission line, the second data transmission line, the first control line, and the second control line extend along a first direction, and the first output end and the second output end are disposed on opposite sides of the first control line.

Based on the above, the multiplexer and the display panel of the disclosure effectively reduce the situation (or the quantity) of intersections or overlaps between the first and second control lines and the first and second data transmission lines (or the first and second data lines) during the wiring (or the layout) planning of the display panel through the design of disposing the first data transmission line and the second data transmission line on opposite sides of the first control line and the second control line. As such, reduction in charging rate of each display pixel due to parasitic capacitance may be prevented, thereby maintaining the quality of display image.

To make the aforementioned and other features of the disclosure more comprehensible, several embodiments accompanied with drawings are described in detail as follows.

DETAILED DESCRIPTION OF DISCLOSED EMBODIMENTS

Figure 1:
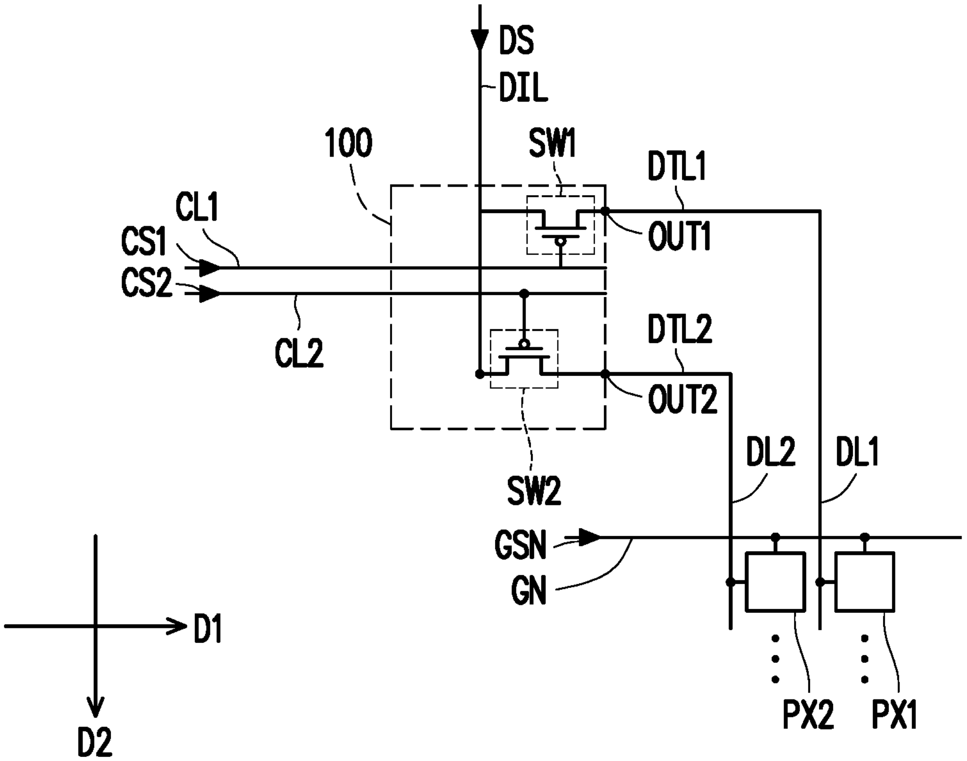
FIG. 1 is a schematic diagram of a multiplexer in accordance with an embodiment of the disclosure.

The term "coupled (or connected)" as used throughout the specification (including the claims) may be used to refer to any direct or indirect means of connection. For example, if it is described in the text that a first device is coupled (or connected) to a second device, it shall be interpreted as the first device may be directly connected to the second device or the first device may be indirectly connected to the second device through other device or certain means of connection. In addition, wherever possible, the elements/components/steps using the same reference numerals in the drawings and the embodiments represent the same or similar parts. Relevant descriptions regarding the elements/components/steps using the same reference numerals or using the same terms in different embodiments may be cross-referenced.

FIG. 1 is a schematic diagram of a multiplexer in accordance with an embodiment of the disclosure. Referring to FIG. 1, in the embodiment, a multiplexer 100 includes an output end OUT1, an output end OUT2, a switch SW1, and a switch SW2. The output end OUT1 of the multiplexer 100 is connected to a data transmission line DTL1 and the output end OUT2 of the multiplexer 100 is connected to a data transmission line DTL2.

On the other hand, a control end of the switch SW1 is coupled to a control line CL1 to receive a control signal CS1. A first end of the switch SW1 is coupled to the output end OUT1 and a second end of the switch SW1 is coupled to a data input line DIL to receive a data signal DS (for example, provided by a source driver). A control end of the switch SW2 is coupled to a control line CL2 to receive a control signal CS2. A first end of the switch SW2 is coupled to the output end OUT2 and a second end of the switch SW2 is coupled to the data input line DIL to receive the data signal DS. In other words, the switch SW1 and the switch SW2 may respectively determine whether the multiplexer 100 supplies the display data in the data signal DS to the data transmission line DTL1 and the data transmission line DTL2 according to the statuses of the control signal CS1 and the control signal CS2.

Furthermore, the output ends OUT1 and OUT2 of the multiplexer 100 may be respectively connected to the data lines DL1 and DL2 through the data transmission lines DTL1 and DTL2, and the data lines DL1 and DL2 may be respectively connected to the corresponding display pixel (i.e. display pixels PX1 and PX2). In addition, the display pixels may be respectively connected to the corresponding gate line (i.e. gate lines GN) so that each display pixel may turn on the corresponding transistor (for example, a thin-film transistor) according to the gate drive signal (i.e. gate drive signal GSN) on the corresponding gate line. The N above is a positive integer.

It shall be noted that the switches SW1 and SW2 of the embodiment may be implemented by a P-type thin-film transistor, but the disclosure is not limited thereto. In addition, persons with ordinary skill in the art may determine the quantities of the control line, data transmission line, data line, display pixel, and gate line above according to design requirements of the multiplexer 100. The disclosure is not limited to the quantities exemplified above.

Regarding the operation details of the multiplexer 100, in the embodiment, when the multiplexer 100 receives an enabled (for example, low voltage level) control signal CS1 and a disabled (for example, high voltage level) control signal CS2, and when the gate drive signal GSN is set as enabled, the multiplexer 100 may turn on the switch SW1 according to the control signal CS1 and turn off the switch SW2 according to the control signal CS2. Under such situation, the multiplexer 100 may provide a first display data in the data signal DS to the corresponding display pixel PX1 through a transmission path formed by the data input line DIL, the data transmission line DTL1, and the data line DL1.

On the other hand, when the multiplexer 100 receives an enabled (for example, low voltage level) control signal CS2 and a disabled (for example, high voltage level) control signal CS1, and when the gate drive signal GSN is set as enabled, the multiplexer 100 may turn on the switch SW2 according to the control signal CS2 and turn off the switch SW1 according to the control signal CS1. Under such situation, the multiplexer 100 may provide a second display data in the data signal DS to the corresponding display pixel PX2 through the transmission path formed by the data input line DIL, the data transmission line DTL2, and the data line DL2. The first display data and the second display data may respectively be, for example, gray scale voltage having pixels of different wavelengths (for example, red, green, or blue pixels), and the disclosure is not particularly limited.

It is worth mentioning that regarding the configuration relationship of each element as shown in FIG. 1, specifically, the multiplexer 100 of the embodiment may be applicable for a display panel, and the multiplexer 100 may be disposed in an active area of the display panel. The active area refers to the effective display region of the display panel, that is, the total area of the display panel capable of displaying text graphics. Furthermore, in the embodiment of FIG. 1, the data transmission line DTL1, the data transmission line DTL2, the control line CL1, and the control line CL2 all extend along a direction D1 (i.e. toward the right of the multiplexer 100).

Specifically, in the embodiment, the output end OUT1 and the output end OUT2 of the multiplexer 100 may be respectively disposed on opposite sides of the control line CL1 and the control line CL2, and the output end OUT1 and the control line CL2 may be disposed on opposite sides of the control line CL1. Also, the position at which the multiplexer 100 receives the data signal DS may be disposed on the same side as the data transmission line DTL1.

According to the description of the embodiment of FIG. 1 above, it can be known that the embodiment disposes the data transmission line DTL1 and the data transmission line DTL2 on opposite sides of the control line CL1 and the control line CL2, and the data lines DL1 and DL2 are respectively connected to the data transmission lines DTL1 and DTL2 to extend along a direction D2 (i.e. toward the bottom of the multiplexer 100), wherein the direction D1 is perpendicular to the direction D2. Therefore, during the wiring (or the layout) planning of each element, the embodiment may effectively reduce the situation (or the quantity) of intersections or overlaps between the control lines CL1 and CL2 and the data transmission lines DTL1 and DTL2 (or the data lines DL1 and DL2). In this way, the multiplexer 100 of the disclosure may effectively reduce the parasitic capacitance between the control lines CL1 and CL2 and the data transmission lines DTL1 and DTL2 (or the data lines DL1 and DL2), so as to prevent reduction in charging rate of each display pixel due to the parasitic capacitance, thereby maintaining the quality of the display image.

Figure 2:
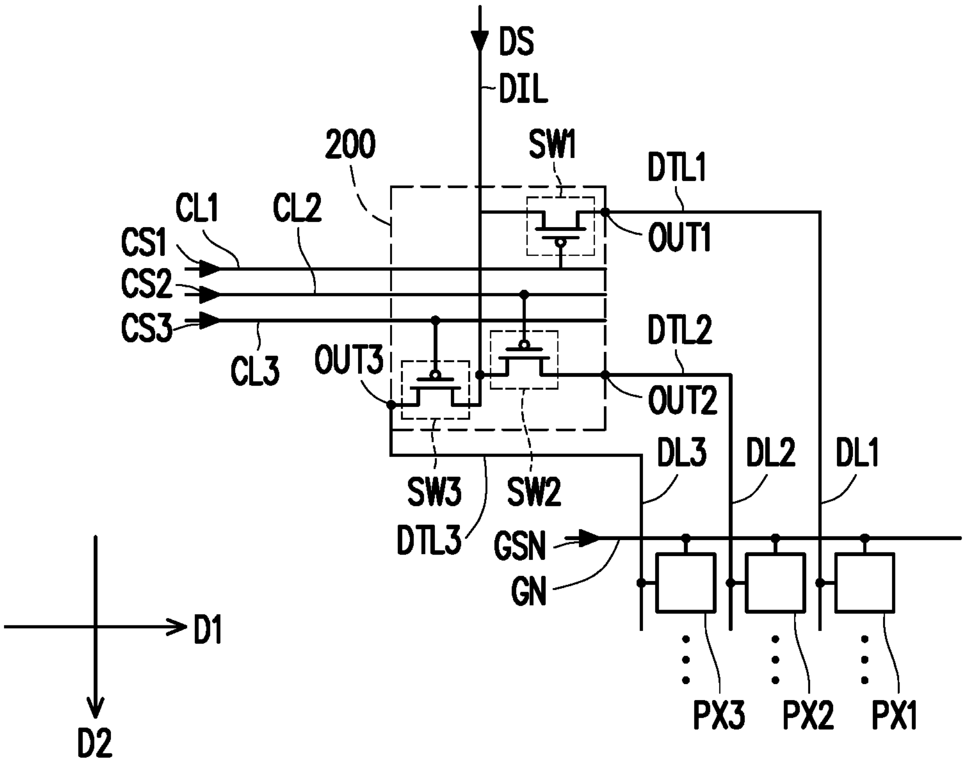
FIG. 2 is a schematic diagram of a multiplexer in accordance with another embodiment of the disclosure.

FIG. 2 is a schematic diagram of a multiplexer in accordance with another embodiment of the disclosure. Referring to FIG. 1 and FIG. 2 at the same time, in the embodiment, a multiplexer 200 is substantially the same as the multiplexer 100, wherein the same or similar elements are given the same or similar reference numerals. Unlike the embodiment of FIG. 1, in the present embodiment, the multiplexer 200 further includes an output end OUT3 and a switch SW3.

Specifically, the output end OUT3 of the multiplexer 200 is connected to a data transmission line DTL3. A control end of the switch SW3 is coupled to a control line CL3 to receive a control signal CS3. A first end of the switch SW3 is coupled to the output end OUT3 and a second end of the switch SW3 is coupled to the data input line DIL to receive the data signal DS.

Furthermore, the output end OUT3 of the multiplexer 200 may be connected to the data line DL3 through the data transmission line DTL3 and the data line DL3 may be connected to the corresponding display pixel (for example, the display pixel PX3). In addition, the display pixel PX3 may be connected to the corresponding gate line GN so that the display pixel PX3 may turn on the corresponding transistor (for example, a thin-film transistor) according to the gate drive signal GSN on the corresponding gate line GN.

It shall be noted that the switch SW3 may also be implemented as a P-type thin-film transistor, but the disclosure is not limited thereto. In addition, the configuration (or the coupling) relationship between the switches SW1 and SW2 and the other elements shown in FIG. 2 may be analogized with reference to the relevant descriptions of the switches SW1 and SW2 mentioned in FIG. 1, and thus shall not be reiterated.

Referring to FIG. 2, regarding the operation details of the multiplexer 200, in the embodiment, when the multiplexer 200 receives an enabled (for example, low voltage level) control signal CS1 and disabled (for example, high voltage level) control signals CS2 and CS3, and when the gate drive signal GSN is set as enabled, the multiplexer 200 may turn on the switch SW1 according to the control signal CS1 and respectively turn off the switches SW2 and SW3 according to the control signals CS2 and CS3. Under such situation, the multiplexer 200 may provide a first display data in the data signal DS to the corresponding display pixel PX1 through a transmission path formed by the data input line DIL, the data transmission line DTL1, and the data line DL1.

Next, when the multiplexer 200 receives an enabled (for example, low voltage level) control signal CS2 and disabled (for example, high voltage level) control signals CS1 and CS3, and when the gate drive signal GSN is set as enabled, the multiplexer 200 may turn on the switch SW2 according to the control signal CS2 and respectively turn off the switches SW1 and SW3 according to the control signals CS1 and CS3. Under such situation, the multiplexer 200 may provide a second display data in the data signal DS to the corresponding display pixel PX2 through the transmission path formed by the data input line DIL, the data transmission line DTL2, and the data line DL2.

In addition, when the multiplexer 200 receives an enabled (for example, low voltage level) control signal CS3 and disabled (for example, high voltage level) control signals CS1 and CS2, and when the gate drive signal GSN is set as enabled, the multiplexer 200 may turn on the switch SW3 according to the control signal CS3 and respectively turn off the switches SW1 and SW2 according to the control signals CS1 and CS2. Under such situation, the multiplexer 200 may provide a third display data in the data signal DS to the corresponding display pixel PX3 through the transmission path formed by the data input line DIL, the data transmission line DTL3, and the data line DL3. The first display data, the second display data, and the third display data may respectively be, for example, gray scale voltage having pixels of different wavelengths (for example, red, green, or blue pixels), and the disclosure is not particularly limited.

Regarding the configuration relationship of each component shown in FIG. 2, specifically, the multiplexer 200 of the embodiment may also be disposed in an active area of the display panel. Furthermore, in the embodiment of FIG. 2, the data transmission lines DTL1 to DTL3 and the control lines CL1 to CL3 all extend along the direction D1 (i.e. toward the right of the multiplexer 200).

Specifically, in the embodiment, the output ends OUT1 to OUT3 of the multiplexer 200 may be respectively disposed on opposite sides of the control lines CL1 to CL3 (wherein the output ends OUT2 and OUT3 are disposed on the same side), the output end OUT1 and the control line CL2 may be disposed on opposite sides of the control line CL1, and the output end OUT1 and the control line CL3 may be disposed on opposite sides of the control lines CL1 and CL2. Also, the position at which the multiplexer 200 receives the data signal DS may be disposed on the same side as the data transmission line DTL1.

According to the description of the embodiment of FIG. 2 above, it can be known that the embodiment disposes the data transmission lines DTL1 to DTL3 on opposite sides of the control lines CL1 to CL3, and the data lines DL1 to DL3 are respectively connected to the data transmission lines DTL1 to DTL3 to extend along the direction D2 (i.e. toward the bottom of the multiplexer 200). Therefore, during the wiring (or the layout) planning of each element, the embodiment may effectively reduce the situation (or the quantity) of intersections or overlaps between the control lines CL1 to CL3 and the data transmission lines DTL1 to DTL3 (or the data lines DL1 to DL3). In this way, the multiplexer 200 of the disclosure may effectively reduce the parasitic capacitance between the control lines CL1 to CL3 and the data transmission lines DTL1 to DTL3 (or the data lines DL1 to DL3), so as to prevent reduction in charging rate of each display pixel due to the parasitic capacitance, thereby maintaining the quality of the display image.

Figure 3:
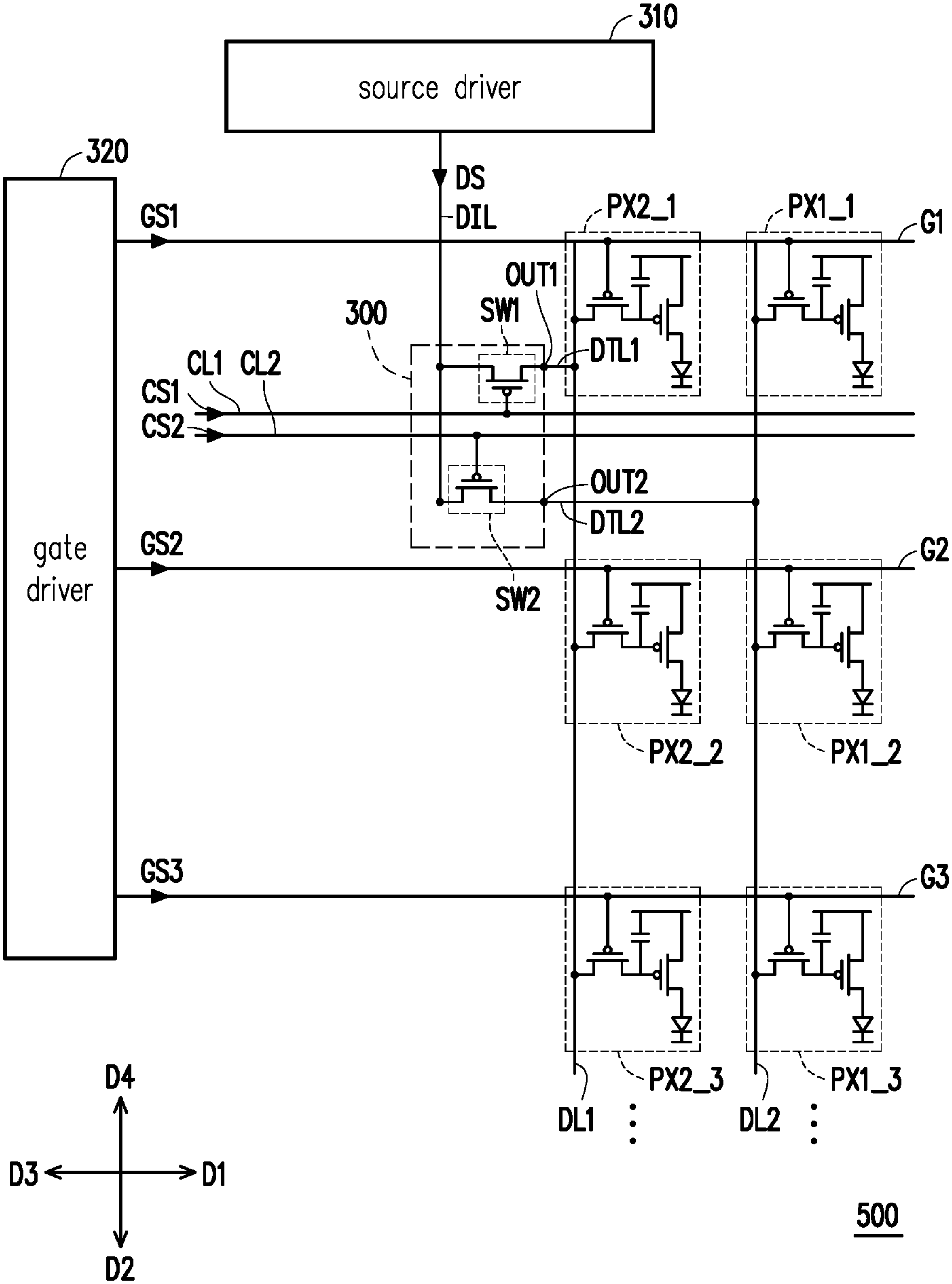
FIG. 3 is a schematic diagram of a display panel in accordance with an embodiment of the disclosure.

FIG. 3 is a schematic diagram of a display panel in accordance with an embodiment of the disclosure. Referring to FIG. 3, in the embodiment, a display panel 500 includes a multiplexer 300, a source driver 310, and a gate driver 320. The source driver 310 may be coupled to the multiplexer 300 through the data input line DIL to provide a data signal DS to the multiplexer 300.

Specifically, the display panel 500 is disposed with a plurality of data lines (i.e. data lines DL1 and DL2), a plurality of gate lines (i.e. gate lines G1 to G3), and a plurality of display pixels (i.e. display pixels PX1_1 to PX1_3 and display pixels PX2_1 to PX2_3). The data lines DL1 and DL2 are perpendicular to the gate lines G1 to G3. The display pixels PX1_1 to PX1_3 and the display pixels PX2_1 to PX2_3 are distributed in a matrix form on the display panel 500. The data lines DL1 and DL2 may be respectively connected to the corresponding display pixels PX2_1 to PX2_3 and PX1_1 to PX1_3. A plurality of output ends of the gate driver 320 is one-to-one coupled to the gate lines G1 to G3 to respectively provide gate drive signals GS1 to GS3 to the corresponding display pixel. It shall be noted that the multiplexer 300 shown in FIG. 3 may be analogized with reference to the relevant descriptions of the multiplexer 100 as mentioned in FIG. 1, and thus shall not be reiterated.

It is worth mentioning that in the embodiment, the multiplexer 300 and the gate driver 320 may be disposed in an active area of the display panel 500 to achieve the effect of a narrow border, thereby effectively reducing the design area of the internal circuit of the display panel 500.

Regarding the operation details of the display panel 500, for example, when the multiplexer 300 receives an enabled (for example, low voltage level) control signal CS1 and a disabled (for example, high voltage level) control signal CS2, and when the gate driver 320 provides an enabled gate drive signal GS1, the multiplexer 300 may turn on the switch SW1 according to the control signal CS1 and turn off the switch SW2 according to the control signal CS2.

Under such situation, the multiplexer 300 may provide a first display data in the data signal DS to the corresponding display pixel PX2_1 through a transmission path formed by the data input line DIL, the data transmission line DTL1, and the data line DL1.

On the other hand, when the multiplexer 300 receives an enabled (for example, low voltage level) control signal CS2 and a disabled (for example, high voltage level) control signal CS1, and when the gate driver 320 provides an enabled gate drive signal GS1, the multiplexer 300 may turn on the switch SW2 according to the control signal CS2 and turn off the switch SW1 according to the control signal CS1. Under such situation, the multiplexer 300 may provide a second display data in the data signal DS to the corresponding display pixel PX1_1 through the transmission path formed by the data input line DIL, the data transmission line DTL2, and the data line DL2. The rest of the situation may be inferred according to the description above depending on the enabling statuses (or sequence) of the gate drive signals GS1 to GS3 and the control signals CS1 and CS2.

In particular, the embodiment does not limit the design of the gate driver 320. For example, under some design requirements, the gate driver 320 may be formed by a plurality of gate drive circuits connected in series, and the gate drive circuits may be respectively coupled to the corresponding gate line to respectively provide the gate drive signal to the corresponding display pixel according to an initial signal.

According to the descriptions of FIG. 1 and FIG. 3 above, it can be known that the embodiment disposes the data transmission line DTL1 and the data transmission line DTL2 on opposite sides of the control line CL1 and the control line CL2, and the data lines DL1 and DL2 are respectively connected to the data transmission lines DTL1 and DTL2 to extend along the direction D2 (i.e. toward the bottom of the multiplexer 300) or a direction D4 (i.e. toward the top of the multiplexer 300), wherein the direction D2 and the direction D4 are opposite directions. Therefore, during the wiring (or the layout) planning of the display panel 500, the embodiment may effectively reduce the situation (or the quantity) of intersections or overlaps between each control line and each data transmission line (or each data line).

In this way, the multiplexer 300 of the disclosure may effectively reduce the parasitic capacitance between each control line and each data transmission line (or each data line), so as to prevent reduction in charging rate of each display pixel due to the parasitic capacitance, thereby maintaining the quality of the display image. Moreover, by disposing the multiplexer 300 and the gate driver 320 in the active area of the display panel 500, the display panel 500 of the embodiment may achieve the effect of a narrow border to reduce the design area of the internal circuit of the display panel 500.

Figure 4:
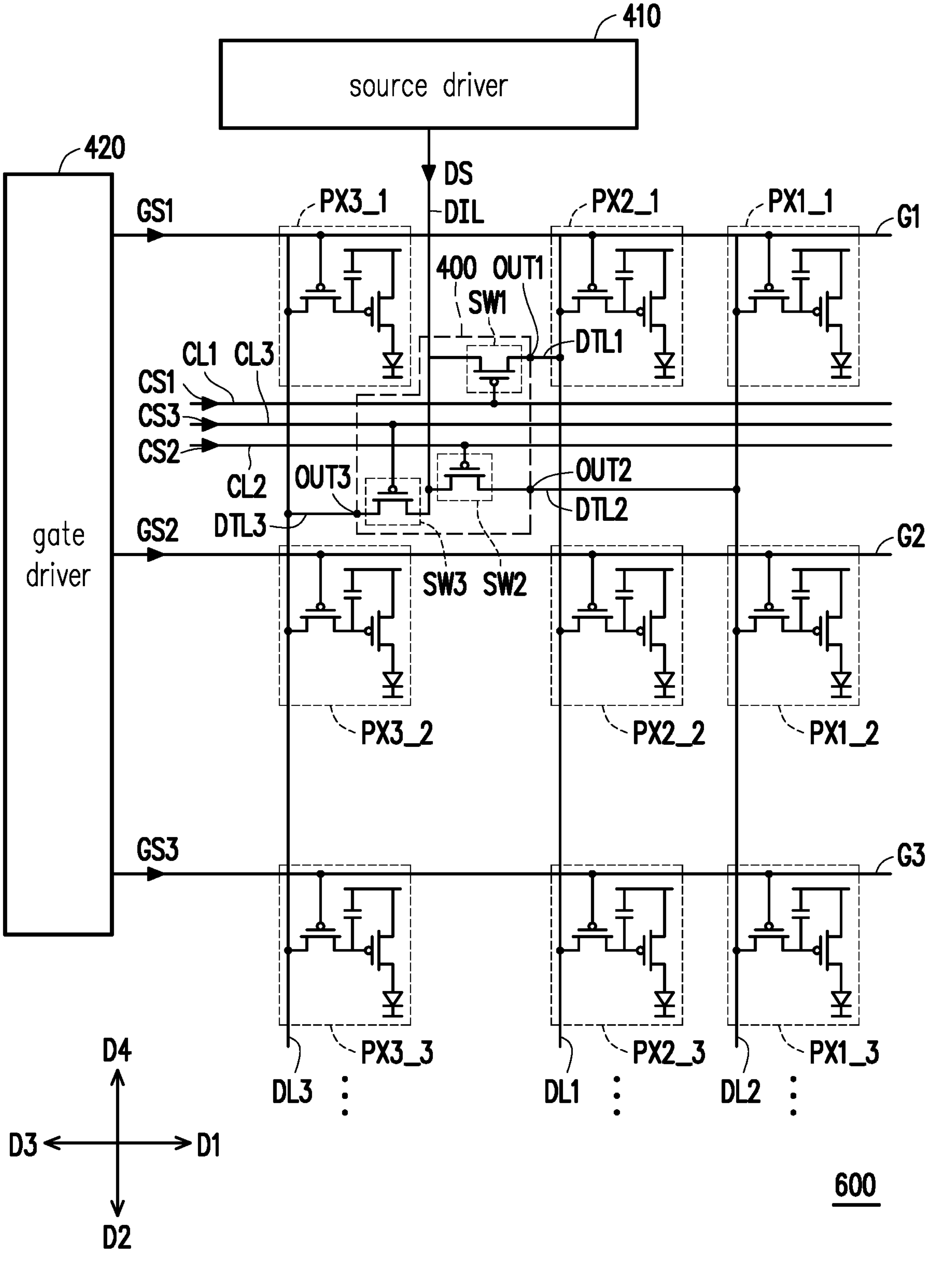
FIG. 4 is a schematic diagram of a display panel in accordance with another embodiment of the disclosure.

FIG. 4 is a schematic diagram of a display panel in accordance with another embodiment of the disclosure. Referring to FIG. 4, in the embodiment, a display panel 600 includes a multiplexer 400, a source driver 410, and a gate driver 420. The source driver 410 may be coupled to the multiplexer 400 through the data input line DIL to provide a data signal DS to the multiplexer 400.

Specifically, the display panel 600 is disposed with a plurality of data lines (i.e. data lines DL1 to DL3), a plurality of gate lines (i.e. gate lines G1 to G3), and a plurality of display pixels (i.e. display pixels PX1_1 to PX1_3, display pixels PX2_1 to PX2_3, and display pixels PX3_1 to PX3_3). The data lines DL1 to DL3 are perpendicular to the gate lines G1 to G3. The display pixels PX1_1 to PX1_3, the display pixels PX2_1 to PX2_3, and the display pixels PX3_1 to PX3_3 are distributed in a matrix form on the display panel 600. The data lines DL1 to DL3 may be respectively connected to the corresponding display pixels PX2_1 to PX2_3, PX1_1 to PX1_3, and PX3_1 to PX3_3. A plurality of output ends of the gate driver 420 is one-to-one coupled to the gate lines G1 to G3 to respectively provide the gate drive signals GS1 to GS3 to the corresponding display pixel.

It shall be noted that, referring to FIG. 2 and FIG. 4 at the same time, the multiplexer 400 is substantially the same as the multiplexer 200, wherein the same or similar elements are given the same or similar reference numerals. Unlike the multiplexer 200 as shown in FIG. 2, in the embodiment, the data transmission line DTL3 extends along a direction D3 (i.e. toward the left of the multiplexer 400), wherein the direction D1 and the direction D3 are opposite directions.

It is worth mentioning that in the embodiment, the multiplexer 400 and the gate driver 420 may be disposed in an active area of the display panel 600 to achieve the effect of a narrow border, thereby effectively reducing the design area of the internal circuit of the display panel 600.

Regarding the operation details of the display panel 600, for example, when the multiplexer 400 receives an enabled (for example, low voltage level) control signal CS1 and disabled (for example, high voltage level) control signals CS2 and CS3, and when the gate driver 420 provides an enabled gate drive signal GS1, the multiplexer 400 may turn on the switch SW1 according to the control signal CS1 and turn off the switches SW2 and SW3 according to the control signals CS2 and CS3.

Under such situation, the multiplexer 400 may provide a first display data in the data signal DS to the corresponding display pixel PX2_1 through a transmission path formed by the data input line DIL, the data transmission line DTL1, and the data line DL1.

Next, when the multiplexer 400 receives an enabled (for example, low voltage level) control signal CS2 and disabled (for example, high voltage level) control signals CS1 and CS3, and when the gate driver 420 provides an enabled gate drive signal GS1, the multiplexer 400 may turn on the switch SW2 according to the control signal CS2 and turn off the switches SW1 and SW3 according to the control signals CS1 and CS3. Under such situation, the multiplexer 400 may provide a second display data in the data signal DS to the corresponding display pixel PX1_1 through the transmission path formed by the data input line DIL, the data transmission line DTL2, and the data line DL2.

Next, when the multiplexer 400 receives an enabled (for example, low voltage level) control signal CS3 and disabled (for example, high voltage level) control signals CS1 and CS2, and when the gate driver 420 provides an enabled gate drive signal GS1, the multiplexer 400 may turn on the switch SW3 according to the control signal CS3 and turn off the switches SW1 and SW2 according to the control signals CS1 and CS2. Under such situation, the multiplexer 400 may provide a third display data in the data signal DS to the corresponding display pixel PX3_1 through the transmission path formed by the data input line DIL, the data transmission line DTL3, and the data line DL3. The rest of the situation may be inferred according to the description above depending on the enabling statuses (or sequence) of the gate drive signals GS1 to GS3 and the control signals CS1 and CS3.

In particular, the embodiment also does not limit the design of the gate driver 420. For example, under some design requirements, the gate driver 420 may also be formed by a plurality of gate driving circuits connected in series, and the gate driving circuits may be respectively coupled to the corresponding gate line to respectively provide the gate drive signal to the corresponding display pixel according to an initial signal.

According to the descriptions of FIG. 2 and FIG. 4 above, it can be known that the embodiment disposes the data transmission lines DTL1 to DTL3 on opposite sides of the control lines CL1 to CL3 and the data lines DL1 to DL3 are respectively connected to the data transmission lines DTL1 to DTL3 to extend along the direction D2 (i.e. toward the bottom of the multiplexer 400) or the direction D4 (i.e. toward the top of the multiplexer 400), wherein the direction D2 and the direction D4 are opposite directions. Therefore, during the wiring (or the layout) planning of the display panel 600, the embodiment may effectively reduce the situation (or the quantity) of intersections or overlaps between each control line and each data transmission line (or each data line).

In this way, the multiplexer 400 of the disclosure may effectively reduce the parasitic capacitance between each control line and each data transmission line (or each data line), so as to prevent reduction in charging rate of each display pixel due to the parasitic capacitance, thereby maintaining the quality of the display image. Moreover, by disposing the multiplexer 400 and the gate driver 420 in the active area of the display panel 600, the display panel 600 of the embodiment may achieve the effect of a narrow border to reduce the design area of the internal circuit of the display panel 600.

Based on the above, the multiplexer and the display panel of the disclosure effectively reduce the situation (or the quantity) of intersections or overlaps between the first and second control lines and the first and second data transmission lines (or the first and second data lines) during the wiring (or the layout) planning of the display panel through the design of disposing the first data transmission line and the second data transmission line on opposite sides of the first control line and the second control line. As such, reduction in charging rate of each display pixel due to parasitic capacitance may be prevented, thereby maintaining the quality of display image.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A multiplexer, applicable for a display panel, comprising:

a first output end for connecting to a first data transmission line;

a second output end for connecting to a second data transmission line;

a first switch having a control end coupled to a first control line, wherein a first end of the first switch is coupled to the first output end and a second end of the first switch is coupled to a data input line; and a second switch having a control end is coupled to a second control line, wherein a first end of the second switch is coupled to the second output end and a second end of the second switch is coupled to the data input line, wherein the first data transmission line, the second data transmission line, the first control line, and the second control line extend along a first direction, and the first output end and the second output end are disposed on opposite sides of the first control line, wherein the first output end and the second control line are disposed on opposite sides of the first control line.

2. The multiplexer according to claim 1, wherein the multiplexer is disposed in an active area of the display panel.

3. The multiplexer according to claim 1, wherein the multiplexer provides a first display data to at least one first display pixel according to a first control signal and a data signal through the first data transmission line, and the multiplexer provides a second display data to at least one second display pixel according to a second control signal and the data signal through the second data transmission line.

4. The multiplexer according to claim 1, wherein the multiplexer further comprises:

a third output end for connecting to a third data transmission line;

a third switch having a control end coupled to a third control line, wherein a first end of the third switch is coupled to the third output end and a second end of the third switch is coupled to the data input line, wherein the third data transmission line extends along the first direction and the second output end and the third output end are disposed on a same side.

5. The multiplexer according to claim 4, wherein the first output and the third control line are disposed on opposite sides of the first control line.

6. The multiplexer according to claim 4, wherein the multiplexer provides a first display data to at least one first display pixel according to a first control signal and a data signal through the first data transmission line, the multiplexer provides a second display data to at least one second display pixel according to a second control signal and the data signal through the second data transmission line, and the multiplexer provides a third display data to at least one third display pixel according to a third control signal and the data signal through the third data transmission line.

7. A display panel, comprising:

a first data line connected to at least one first display pixel;

a second data line connected to at least one second display pixel; and a multiplexer, comprising:

a first output end for connecting to a first data transmission line;

a second output end for connecting to a second data transmission line;

a first switch having a control end coupled to a first control line, wherein a first end of the first switch is coupled to the first output and a second end of the first switch is coupled to a data input line; and a second switch having a control end coupled to a second control line, wherein a first end of the second switch is coupled to the second output end and a second end of the second switch is coupled to the data input line, wherein the first data transmission line, the second data transmission line, the first control line, and the second control line extend along a first direction, and the first output end and the second output end are disposed on opposite sides of the first control line, wherein the first output end and the second control line are disposed on opposite sides of the first control line.

8. The display panel according to claim 7, wherein the display panel further comprises:

a gate driver having a plurality of gate lines coupled to the at least one first display pixel and the at least one second display pixel, and is configured to provide a plurality of gate drive signals.

9. The display panel according to claim 8, wherein the multiplexer and the gate driver are disposed in an active area of the display panel.

10. The display panel according to claim 7, wherein the multiplexer provides a first display data to the at least one first display pixel according to a first control signal and a data signal through the first data transmission line, and the multiplexer provides a second display data to the at least one second display pixel according to a second control signal and the data signal through the second data transmission line.

11. The display panel according to claim 7, wherein the display panel further comprises:

a third data line connected to at least one third display pixel; and the multiplexer further comprises:

a third output end for connecting to a third data transmission line; and a third switch having a control end coupled to a third control line, wherein a first end of the third switch is coupled to the third output end and a second end of the third switch is coupled to the data input line, wherein the third data transmission line extends along the first direction or a second direction, and the second output end and the third output end are disposed on a same side, wherein the first direction and the first direction are opposite to each other.

12. The display panel according to claim 11, wherein the first output end and the third output end are disposed on opposite sides of the first control line.

13. The display panel according to claim 11, wherein the multiplexer provides a first display data to the at least one first display pixel according to a first control signal and a data signal through the first data transmission line, the multiplexer provides a second display data to the at least one second display pixel according to a second control signal and the data signal through the second data transmission line, and the multiplexer provides a third display data to the at least one third display pixel according to a third control signal and the data signal through the third data transmission line.

* * * * *